(12) United States Patent
Porkka (10) Patent No.: US 7,055,128 B2
(45) Date of Patent: May 30, 2006

(54) SYSTEM AND METHOD TO COMMUNICATE, COLLECT AND DISTRIBUTE GENERATED SHARED FILES

(75) Inventor: Joseph A. Porkka, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 796 days.

(21) Appl. No.: 09/729,448

(22) Filed: Dec. 4, 2000

(65) Prior Publication Data

US 2004/0083450 A1 Apr. 29, 2004

(51) Int. Cl.
G06F 9/44 (2006.01)

(52) U.S. Cl. ...................................... 717/103

(58) Field of Classification Search ........ 717/101–121, 717/145, 149
See application file for complete search history.

(56) References Cited

U.S. PATENT DOCUMENTS

| | | | | |
|---|---|---|---|---|
| 4,951,192 | A * | 8/1990 | Chase et al. | 717/149 |
| 5,339,435 | A * | 8/1994 | Lubkin et al. | 717/121 |
| 5,361,360 | A * | 11/1994 | Ishigami et al. | 717/103 |
| 5,748,961 | A * | 5/1998 | Hanna et al. | 717/145 |
| 6,457,170 | B1 * | 9/2002 | Boehm et al. | 717/106 |

OTHER PUBLICATIONS

Microsoft Press Computer Dictionary, Second Edition, 1993, p. 193.*

M. Devarakonda, et al., *Evaluation of Design Alternatives for a Cluster File System*, Proceedings of the 1995 USENIX Technical Conference, Jan. 16-20, 1995, p. 35-46.

Charles Changli Chin, et al., *Transparency in a Replicated Network File System*, Proceedings of the 22nd EUROMICRO Conference, Sep. 2-5, 1996, p. 285-291.

LG Wells, *Client/Server Computing—Is This The Future Disrection For The Clinical Laboratory*, CC Life, 1996, vol. 39, No. 22, pp. 31-38.

B.L. Flanders, *The Establishment and Use of a State-Wide Electronic Interlibrary Loan and Message Switching Network*, Online '87 Conference Proceedings, Oct. 20-22, 1987, p. 73-76.

* cited by examiner

Primary Examiner—Kakali Chaki
Assistant Examiner—Trenton J. Roche
(74) Attorney, Agent, or Firm—Amin & Turocy, LLP (57) ABSTRACT

Disclosed is a system for managing the distribution and collection of files involved in building a software system. The system includes a first component for building a list of file names of files to be shared by build machines employed in building the software system, and a second component for distributing to one or more of the build machines, one or more files being stored persistently by the one or more build machines. Disclosed also is an alternative embodiment of the system for managing the distribution and collection of files involved in building a software system wherein files built by the build machines are broadcast to other build machines that will determine whether to receive and persistently store those files.

13 Claims, 8 Drawing Sheets

```
hPublisher
    BM_1                                          ⟍ 300
        hPublishEnlistment
            E:\ntsrc
                aPublishedFile
                    0
                        strPublishedStatus = add to publish log
                        strName = E:\ntsrc\public\internal\TermSrv\lib\i386\syslib.lib
                    1
                        strPublishedStatus = add to publish log
                        strName = E:\ntsrc\public\internal\TermSrv\lib\i386\tsnotify.lib
    BM_2
        hPublishEnlistment
            C:\ntsrc
                aPublishedFile
                    0
                        strPublishedStatus = duplicate
                        strName = C:\ntsrc\public\internal\TermSrv\lib\i386\syslib.lib hPublishedFiles
    \internal\termsrv\lib\i386\syslib.lib         ⟍ 400
        aReferences
            0
                strName = BM_1
                strDir = "E:\ntsrc
            1
                strName = BM_2
                strDir = "C:\ntsrc PublishedFile
            strPublishedStatus = add to publish log
            strName = E:\ntsrc\public\internal\TermSrv\lib\i386\syslib.lib \internal\termsrv\lib\i386\tsnotify.lib
        aReferences
            0
                strName = BM_1
                strDir = E:\ntsrc PublishedFile
            strPublishedStatus = add to publish log
            strName = E:\ntsrc\public\internal\TermSrv\lib\i386\tsnotify.lib
```

SYSTEM AND METHOD TO COMMUNICATE, COLLECT AND DISTRIBUTE GENERATED SHARED FILES

TECHNICAL FIELD

The present invention relates generally to computer systems, and more particularly to managing the distribution and collection of files involved in building a software system.

BACKGROUND

As software systems have become more complicated, it has become common to build such systems from more than one file. For example, a software system may include hundreds of files. Building a software system can be undertaken on one or more build machines, which may, for example, compile, assemble, link, and/or interpret files. Keeping track of such a large number of files introduces complexity into managing the build machines. Similarly, as preparing the files to be included in a software system has become more complicated, it has become more common to distribute the preparation of such files to more than one build machine and/or process (hereinafter referred to as a "build machine"). Such distribution complicates building software systems.

Many files needed in the completed software product can be built in stages, requiring many source and generated/built files. Many build machines may have complete copies of the source files. However, files generated by one part of the build process may be required as inputs to one or more other parts of the build process. For example, if a build machine A generates a file A1, and a build machine B generates a file B2, build machine A may need file B1 to produce a file A2, and build machine B may need file A1 to produce file B2. Thus a system and method is required to synchronize machines cooperating in a build process to ensure that files are processed in a proper order and that built files are copied to build machines that require the built files.

Distributing files necessary to complete the build of the software system to the build machines involved in the build is network bandwidth intensive, requiring large transfers of information, some of which may be duplicative or unnecessary. For example, one build machine may only need ten files to complete its portion of the build, while another build machine may need two hundred files to complete its portion of the build.

Distributing unnecessary files can slow the build process and introduce extra sources for system failure. Maintaining the files necessary to complete the build of the software system on one central server can cause unnecessarily repetitive downloads, and thus slow down the build machine. For example, if build machine A utilizes file A in step 1 of the build, and then also utilizes file A in step 3 of the build, then if the file A is stored only on a central server, the file A may need to be distributed to build machine A twice, introducing unnecessary complexity into the build process and slowing down the build process.

Consequently, there is a need for a system and method for managing builds of software systems that reduces bandwidth requirements, reduces duplicative copying and mitigates file sharing and locking problems.

SUMMARY

The present invention provides a system for building a software system wherein a build manager and/or process (hereinafter "build manager") oversees building the software system and manages collecting and distributing build files so that software system builds can be completed more efficiently. The build of the software system can be carried out by one or more build machines and/or processes (hereinafter "build machines"). It is to be appreciated by one skilled in the art that a build machine can be a physical machine (e.g. one or more computers), or a virtual machine (e.g. one or more processes executing on one or more computers). A build machine can persistently store a local copy of the file or files employed in building a portion of the software system. As the build machine completes processing a portion of the build, the build machine publishes to the build manager a list of the names of the build files that the build machine produced. The build manager collects the lists of build file names from the build machines cooperating in the build. After such collection, the build manager distributes to the build machines cooperating in the build a list of file names corresponding to files that the build machine is to send to a post build machine and/or process (hereinafter "post build machine") and a list of file names corresponding to files that a build machine should receive back from the post build machine.

In an alternative embodiment of the present invention, one or more build machines broadcast one or more build files to one or more build machines cooperating in building the software system. Each build machine may then determine which of the broadcast build files to receive and store persistently.

Another aspect of the present invention provides a system for building a software system. The system includes a first component for building a list of file names of files to be shared by a plurality of build machines employed in building the software system and further includes a second component for distributing to one or more of the build machines one or more files, identified in the list of file names, that are to be stored persistently by the one or more build machines.

Another aspect of the present invention provides a system for building a software system. The system includes one or more build machines that include a component for broadcasting to one or more of the build machines one or more build files that are stored persistently by a set of the one or more build machines and that further include a component for selectively receiving and storing persistently one or more of the broadcast build files.

Still another aspect of the present invention provides a method for building a software system that includes: collecting from one or more build machines, one or more file names corresponding to the one or more build files; determining which of the one or more build files the one or more build machines are to send to a post build machine; persistently storing the one or more build files on the one or more build machines; sending to the one or more build machines a list of file names of build files to be sent to the post build machine; sending the one or more build files to the post build machine; determining which of the one or more build files the one or more build machines are to receive from the post build machine; sending to the one or more build machines a list of file names of build files to be received from the post build machine; distributing one or more build files to the one or more build machines; and persistently storing the one or more build files distributed to the one or more build machines.

Yet another aspect of the present invention provides a computer readable medium having computer-executable components including a build machine for: building one or more build files; transmitting a first list of one or more file names of the one or more build files to a build manager; receiving a second list of one or more file names of one or more build files to transmit to a post build machine; transmitting to the post build machine the one or more build files identified in the second list; receiving a third list of one or more file names of one or more build files to receive from a post build machine and to store persistently; receiving the one or more build files identified in the third list from the post build machine; and storing persistently the one or more build files received from the post build machine.

Another aspect of the present invention provides a data structure that is storable on a computer readable medium or transmittable over a communication medium, that includes a first data field containing first data representing one or more file names transmitted to a build manager, the file names identifying one or more build files; and a second data field containing second data representing a subset of the one or more file names to be transmitted to a post build machine, the second data derived from the first data by determining which of the one or more build files of the first data are to be employed by and stored persistently by one or more build machines employed in building a software system.

Another aspect of the present invention provides a build machine including a first component for building one or more build files, a second component for creating a first list of file names of build files, and for transmitting the first list of file names to a build manager, a third component for receiving a second list of file names of build files, where the second list of file names identifies files to transmit to a post build machine, and wherein the third component transmits the build files identified in the second list of file names to the post build machine, a fourth component for receiving one or more build files transmitted to the build machine by the post build machine and a fifth component for persistently storing one or more build files.

Another aspect of the present invention provides a build machine including a first component for building one or more build files, a second component for determining which of the one or more build files to broadcast to one or more build machines, a third component for receiving one or more build files transmitted to the build machine by one or more build machines, a fourth component for selecting which of the one or more received build files to store persistently and a fifth component for storing persistently the one or more received build files selected by the fourth component to be stored persistently.

Another aspect of the present invention provides a build manager that includes a first component for receiving one or more first lists of file names built by one or more build machines, a second component for generating one or more second lists of file names of files to be transmitted by one or more build machines to a post build machine, and for transmitting the one or more second lists of file names to the one or more build machines and a third component for generating one or more third lists of file names of files to be received by one or more build machines from the post build machine, wherein the one or more files identified in the one or more third lists of file names are to be stored persistently by one or more build machines, and for transmitting the one or more third lists to one or more build machines.

Another aspect of the present invention provides a post build machine, which may also function as a build machine, that includes a first component for building one or more build files, a second component for broadcasting one or more build files to one or more build machines based on instructions from a build manager, a third component for receiving one or more build files transmitted to the post build machine by one or more build machines, a fourth component for selecting which of the one or more received build files to store persistently and a fifth component for storing persistently the one or more received build files selected by the fourth component to be stored persistently.

To the accomplishment of the foregoing and related ends, certain illustrative aspects of the invention are described herein in connection with the following description and the annexed drawings. These aspects are indicative, however, of but a few of the various ways in which the principles of the invention may be employed, and the present invention is intended to include all such aspects and their equivalents. Other advantages and novel features of the invention may become apparent from the following detailed description of the invention when considered in conjunction with the drawings.

DETAILED DESCRIPTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, to one skilled in the art that the present invention can be practiced without these specific details. In other instances, well-known structures and devices are shown in block diagram form in order to facilitate description of the present invention.

Figure 1:
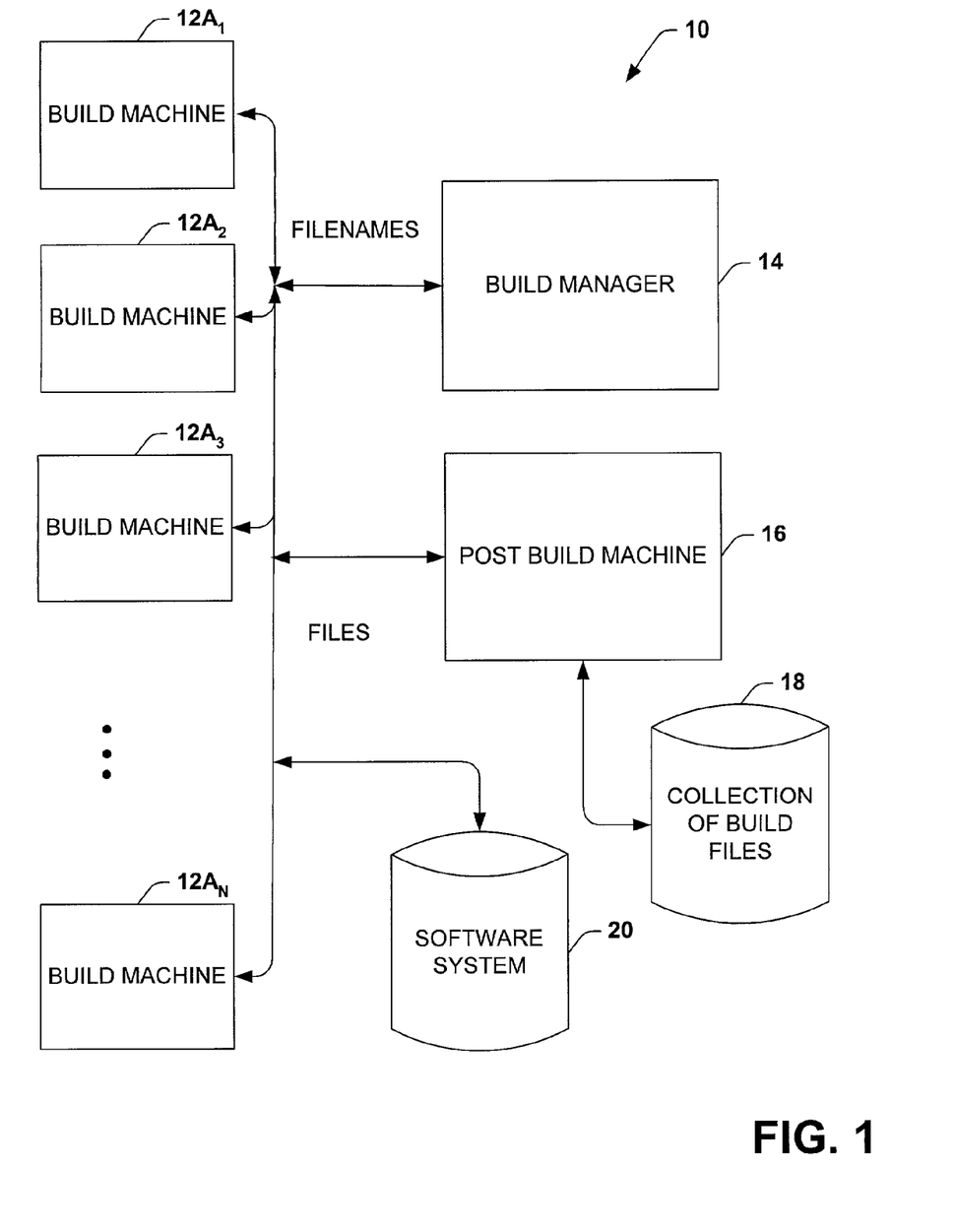
FIG. 1 is a schematic block diagram illustrating a system for managing the distribution and collection of files involved in building a software system in accordance with an aspect of the present invention.

Referring initially to FIG. 1, a system 10 for managing the distribution and collection of files involved in building a software system 20 is illustrated. The system 10 may include a plurality of build machines $12A_1$, $12A_2$, $12A_3$ through $12A_N$, (N being an integer) collectively referred to as the build machines 12A. One of the build machines 12A can be designated as a post build machine 16. It is to be appreciated by one skilled in the art that the build machines 12A can be physical machines (e.g. one or more computers), and/or virtual machines (e.g. one or more processes running on one or more computers). The build machines 12A can produce one or more build files employed in the software system 20. For example, the build machines may compile, assemble, interpret, and/or link one or more source files into one or more build files. As the build machines 12A build one or more build files, the build machines 12A can compile lists of the names of those build files that are "published. A published file is one which is listed as a published file in one or more makefiles associated with the software system 20 being built. The build machines 12A can then transmit the lists of build file names to a build manager 14. The build manager 14 can then determine, for each of the build machines 12A, a list containing a subset of names of build files that the build machines 12A should transmit to the post build machine 16, which creates a collection or set 18 of build files. It is to be appreciated by one skilled in the art that the post build machine 16 may be a physical machine (e.g. one or more computers), and/or a virtual machine (e.g. one or more processes executing on one or more computers). It is to be further appreciated that the post build machine 16 may also function as a build machine 12. The build manager 14 can also determine, for each of the build machines 12A, a list containing a subset of the names of files that the build machines 12A should receive back from the post build machine. Once the lists of the names of the files to transmit to, and receive from, the post build machine 16 have been distributed to the build machines 12A, the files can be transferred to and from the post build machine 16. The file transfers can be initiated, for example, by the build machines 12A, the build manager 14, the post build machine 16, or another process. The system 10 can undergo one or more stages of the processes described above to complete building the software system 20. At one or more stages, the system 10 will wait for the build machines 12A to complete their building and copying to the post build machine 16 before initiating acquiring files from the post build machine 16.

It is to be appreciated by one skilled in the art that although multiple build machines 12A are illustrated in FIG. 1, that a greater or lesser number of build machines 12A can be employed in the system 10. Similarly, it is further to be appreciated that although the build manager 14, and the post build machine 16, are illustrated independently, the processes executed by the build manager 14, and/or the post build machine 16, can execute on the same physical and/or virtual machine or machines. Similarly, it is to be appreciated by one skilled in the art that although the build machines 12A are illustrated independently, one or more build machines 12A can execute on the same physical and/or virtual machine or machines, and that one or more build machines 12A can execute on the same physical and/or virtual machine or machines as one or more of the build manager 14, or the post build machine 16. Build files built and received by the build machines 12A can be stored persistently by the build machines 12A. Thus, overall network traffic can be diminished, and the problems of repetitive copying of the same file can be mitigated. With the amount of copying to and from a central file server being reduced, the overall speed of the build process can be increased. In accordance with another aspect of the present invention, the system for building a software system can employ a broadcast method, instead of a central post build machine method, to distribute build files.

Figure 2:
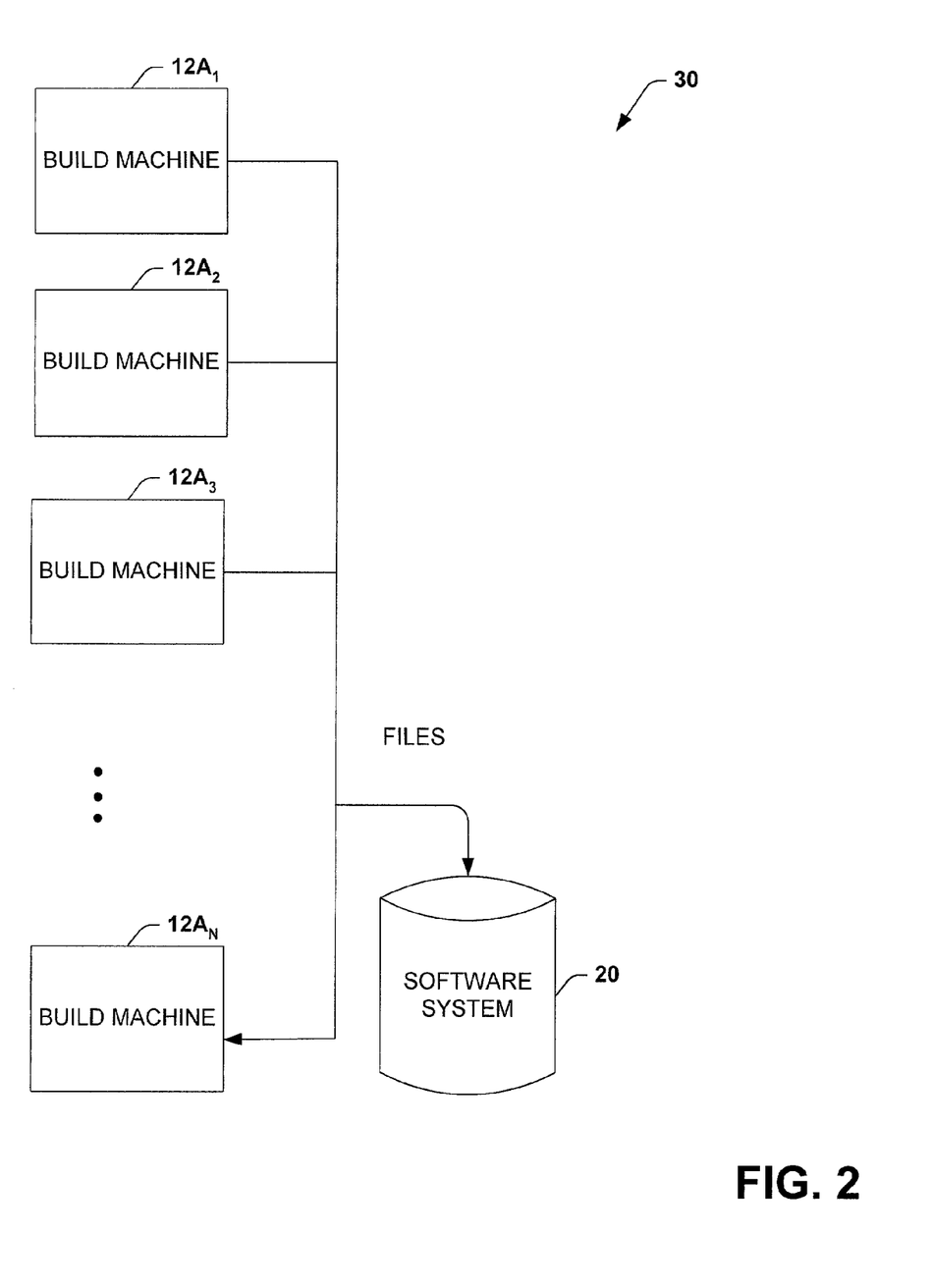
FIG. 2 is a schematic block diagram illustrating an alternative embodiment of thesystem for managing the distribution and collection of files involved in building a software system in accordance with an aspect of the present invention.

Turning now to FIG. 2, a system 30 for managing the files involved in building a software system 20 is illustrated. The system 30 can include a plurality of build machines 12A$_1$, 12A$_2$, 12A$_3$ through 12A$_N$, (N being an integer) collectively referred to as the build machines 12A. The build machines 12A can produce one or more build files employed in the software system 20. As the build machines 12A build one or more build files, the build machines 12A can broadcast the names of the build files, information concerning the build files, and/or the build files to the other build machines 12A rather than to a build manager. The build machines 12A can determine which of the broadcast files to receive from the other build machines 12A. Build files received by the build machines 12A can be stored persistently by the build machines 12A. The system 30 can undergo one or more iterations of the processes described above in building the software system 20.

It is to be appreciated by one skilled in the art that although multiple build machines 12A are illustrated in FIG. 2, that a greater or lesser number of build machines 12A can be employed in the system 30. Similarly, it is to be appreciated by one skilled in the art that although the build machines 12A are illustrated independently, that one or more build machines 12A can execute on the same physical and/or virtual machine or machines. Using the broadcast method, the file sharing, and repetitive copying problems can also be mitigated.

Figure 3:
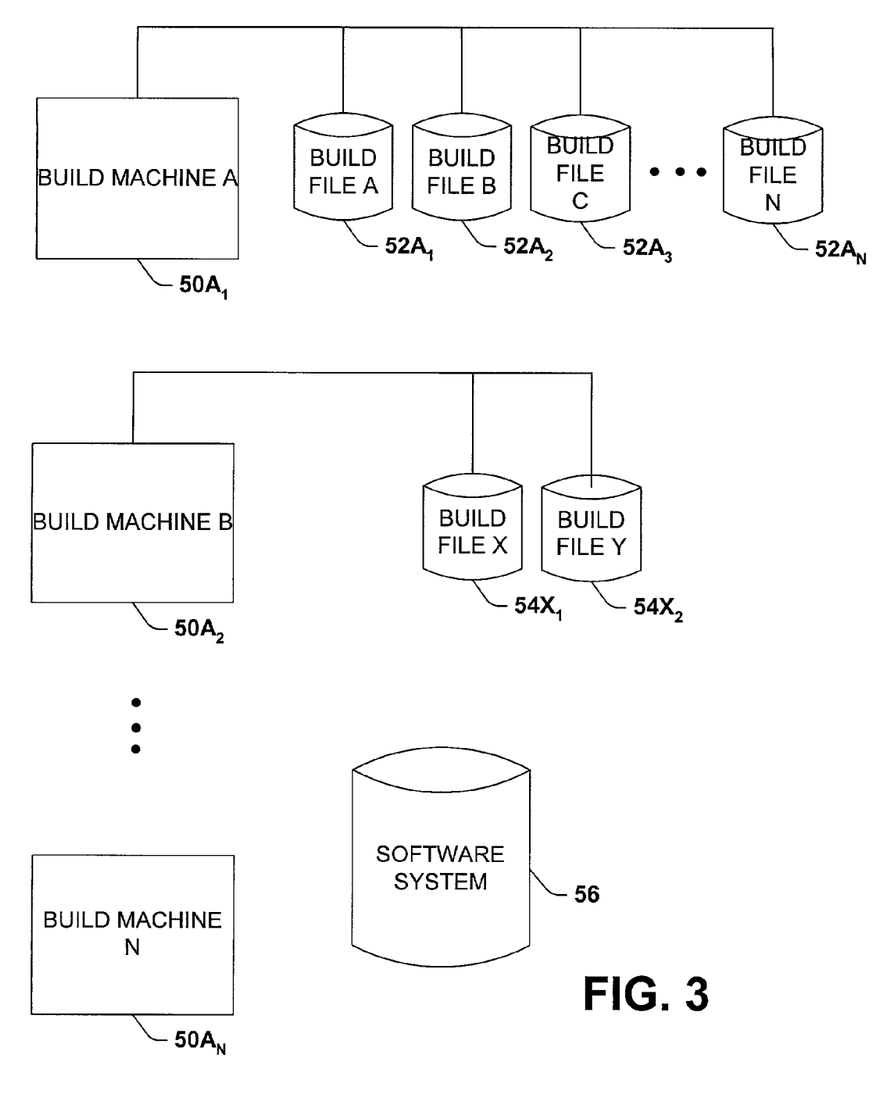
FIG. 3 is a schematic block diagram illustrating build machines involved in building a software system in accordance with an aspect of the present invention.

FIG. 3 illustrates build machines and build files involved in building a software system 56. A build machine A 50A$_1$, a build machine B 50A$_2$, and build machines through a build machine N 50A$_N$ (N being an integer), referred to collectively as the build machines 50A, can each produce build files during one or more iterations of building a software system 56. For example, the build machine A 50A$_1$ can produce, among other build files, a build file A 52A$_1$, a build file B 52A$_2$, a build file C 52A$_3$ through a build file N 52A$_N$ (N being an integer), referred to collectively as the build files 52A. Similarly the build machine B 50A$_2$ can produce, among other build files, a build file X 54X$_1$ and a build file Y 54X$_2$. But one or more build machines 50A may not produce build files during an iteration of the building of a software system. For example, the build machine N 50A$_N$ may not produce build files during an iteration of the build process. The build machines 50A can transmit a list of the names of the build files built by the build machines 50A to the build manager 14 (FIG. 1), in accordance with the system 10 illustrated in FIG. 1, or can transmit the file names, other information concerning the build files and/or the build files to the other build machines, in accordance with the system 30 illustrated in FIG. 2. The build manager 14 (FIG. 1) may create a set of the file names from which a subset of file names, may be created, where the file names in the subset correspond to files to be transmitted to the post build machine 16 (FIG. 1). The subset is defined as containing a number of file names less than or equal to the number of file names contained in the set of file names. Similarly, the build manager 14 (FIG. 1) may create a second subset of file names, where the file names in the subset correspond to files to be received from the post build machine 16 (FIG. 1).

Figure 4:
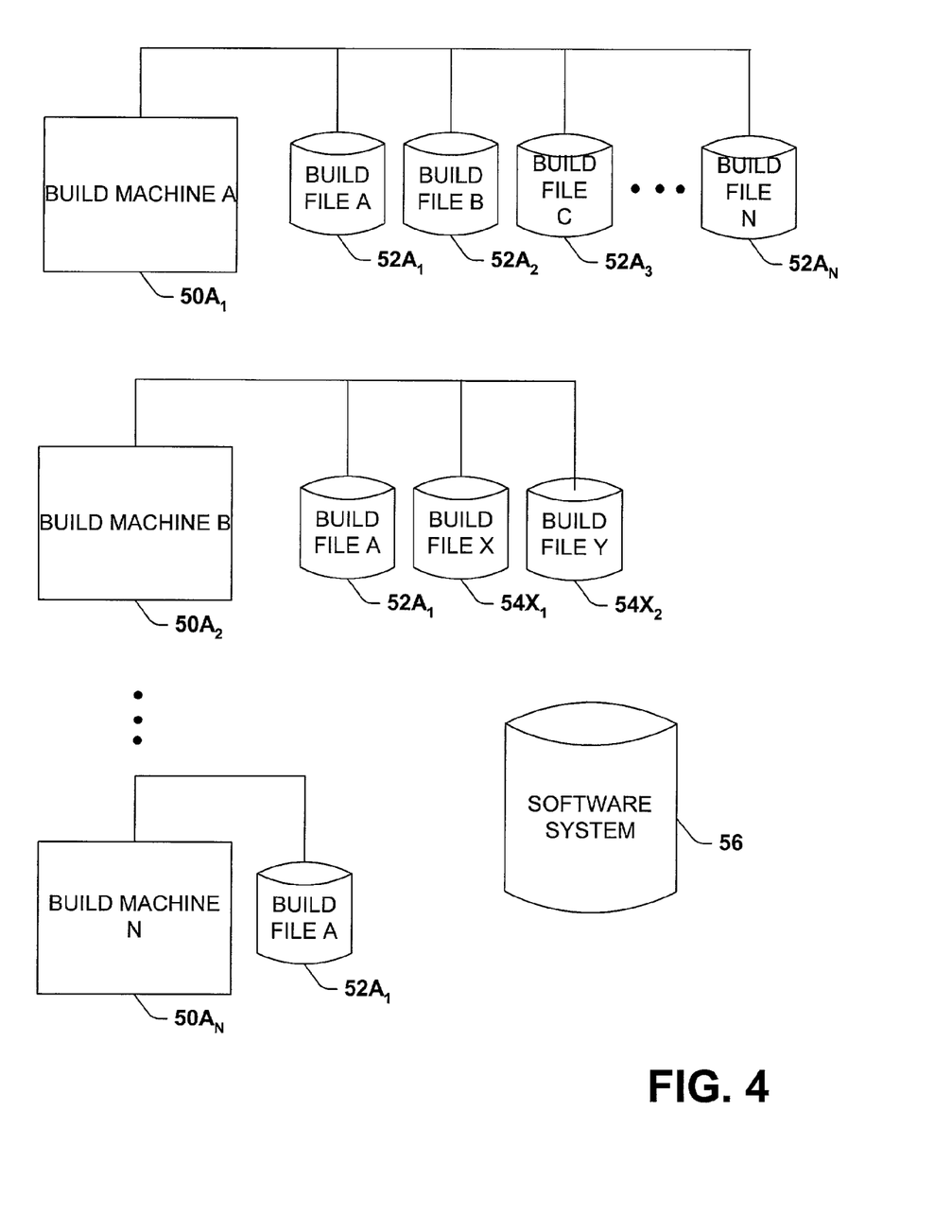
FIG. 4 is a schematic block diagram further illustrating build machines involved in building a software system in accordance with an aspect of the present invention.

FIG. 4 is a schematic block diagram further illustrating the build machines 50A involved in building the software system 56. In FIG. 4, one or more build files have been distributed to one or more of the build machines 50A. For example, the build file A 52A$_1$ has been distributed to the build machine B 50A$_2$ and to the build machine N 50A$_N$. The build machine B 50A$_2$ can store the build file A 52A$_1$ persistently thus mitigating the need to copy the build file A 52A$_1$ repeatedly in the future. Similarly, the build machine N 50A$_N$ can also store persistently the build file A 52A$_1$. In accordance with the system 10 illustrated in FIG. 1, the build file A 52A$_1$ can send to the post build machine 16 (FIG. 1), and then can transmit from the post build machine 16 (FIG. 1) to the build machine B 50A$_2$ and the build machine N 50A$_N$. But other build files, for example build file B 52A$_2$, may not have been transmitted to the post build machine 16 (FIG. 1) if the build manager 14 (FIG. 1) determined that other build machines 50A did not require the build file B 52A$_2$ for subsequent processing in building the software system 56.

In accordance with an alternative embodiment of the system 30, illustrated in FIG. 2, the build file A 52A$_1$ can broadcast to the build machines 50A whereupon it was received and stored persistently by the build machine B 50A$_2$ and the build machine N 50A$_N$. Similarly, the build file B 52A$_2$ may have been broadcast to the build machines 50A, but the build machine B 50A$_2$ and the build machine N 50A$_N$ may have determined that build file B 52B was not required for subsequent processing in building the software system 56, and thus build file B 52A$_2$ was not stored persistently by the build machine B 50A$_2$ and the build machine N 50A$_N$.

Figure 5:
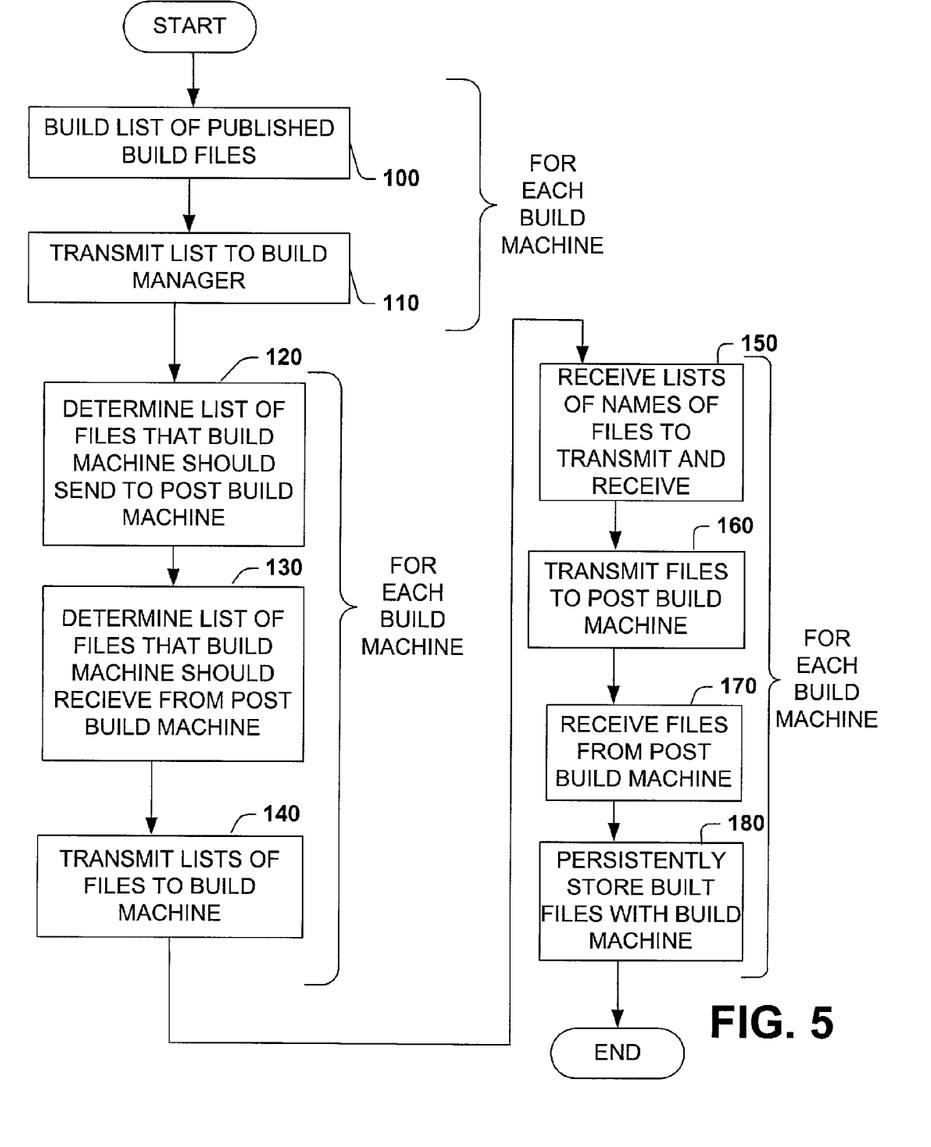
FIG. 5 is a flow chart illustrating a method for managing the distribution and collection of files involved in building a software system in accordance with an aspect of the present invention.

FIG. 5 is a flow chart illustrating a method for managing the distribution and collection of files involved in building a software system. Steps 100 and 110 represent steps that can be performed by each build machine involved in building the software system. At step 100, a build machine can build a list of published file names built by that build machine during an iteration of the build process. Then at step 110, the build machine can transmit the list of the names of the files built by that build machine to a build manager.

Steps 120 through 140 represent steps that can be performed by a build manager involved in building the software system. At step 120, the build manager can determine a list of files that each build machine should send to a post build machine. At step 130, the build manager can determine a list of files that each build machine should receive from the post build machine. At step 140, the build manager can transmit the lists of names of files of step 120 and step 130 to the build machines. In an alternative embodiment of the present invention, at step 120, the build manager can determine a list of files and/or file updates that each build machine should send to a post build machine and, at step 130, the build manager can determine a list of files, and/or file updates, that each build machine should receive back from the post build machine.

Steps 150 through 180 represent steps that can be performed by the build machines. At step 150, the build machines can receive the list of names of files to transmit to the post build machine, and the list of names of files to receive back from the post build machine. Between steps 160 and 170 the build machines will wait for the other build machines to complete step 160 before continuing to step 170. This synchronization is managed by the build manager. At step 160, the files can be transmitted to the post build machine. At step 170, the files transmitted from the post build machine can be received by the build machines. It is to be appreciated by one skilled in the art that the file transfers may be initiated by the build machines, the build manager, the post build machine and/or another process. At step 180, the build machine can persistently store the build files with which it is now associated. Thus, the problems of repeated downloads of a build file is mitigated, because a local copy is retained persistently.

Figure 6:
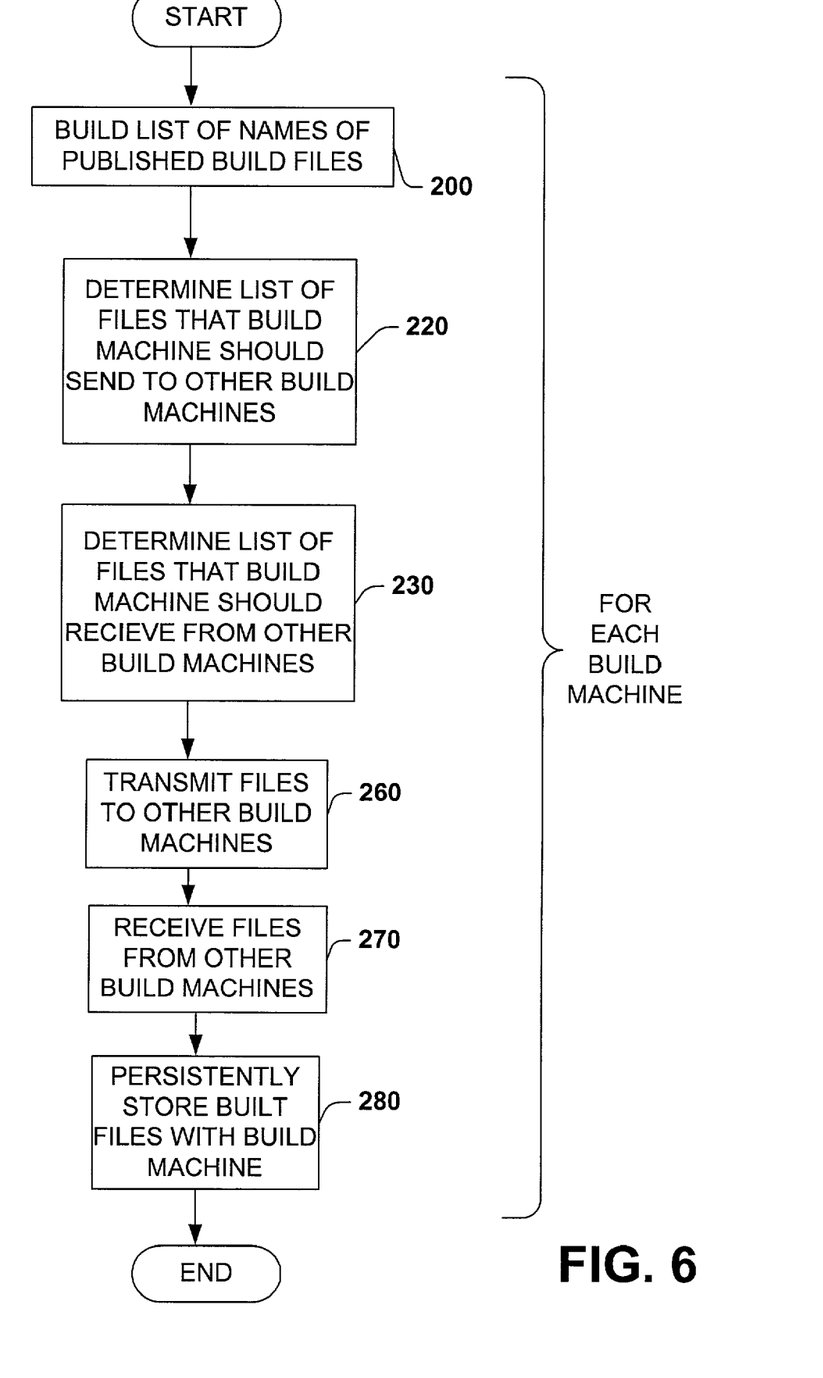
FIG. 6 is a flow chart illustrating an alternative method for managing the distribution and collection of files involved in building a software system in accordance with an aspect of the present invention.

FIG. 6 is a flow chart illustrating an alternative method for managing the distribution and collection of files involved in building a software system. At step 200, a build machine can build a list of names of files built by that build machine. At step 220, the build machine can determine the list of files that the build machine should broadcast to other build machines. At step 230, the build machine can determine the list of files that the build machine should receive from other build machines. At step 260, the build machine can broadcast the file names, information concerning the files or the build files to the other build machines. In an alternative embodiment of the present invention, at step 220, the build machine can determine a list of files and/or file updates that each build machine should broadcast to other build machines and at step 230 the build machine can determine a list of files and/or file updates that the build machine should receive from the other build machines cooperating in building the software system and at step 260, the build machine may broadcast the updates and/or files to other build machines cooperating in building the software system.

At step 260 the files can be broadcast to the other build machines cooperating in building the software system. At step 270, the files broadcast from the other build machines cooperating in building the software system can be received by the build machine. It is to be appreciated by one skilled in the art that the file transfers may be initiated by the build machines, and/or another process. At step 280, the build machine can persistently store the build files with which it is now associated. Thus, the problems of repeated downloads of a build file is mitigated, because a local copy is retained persistently.

Figure 7:
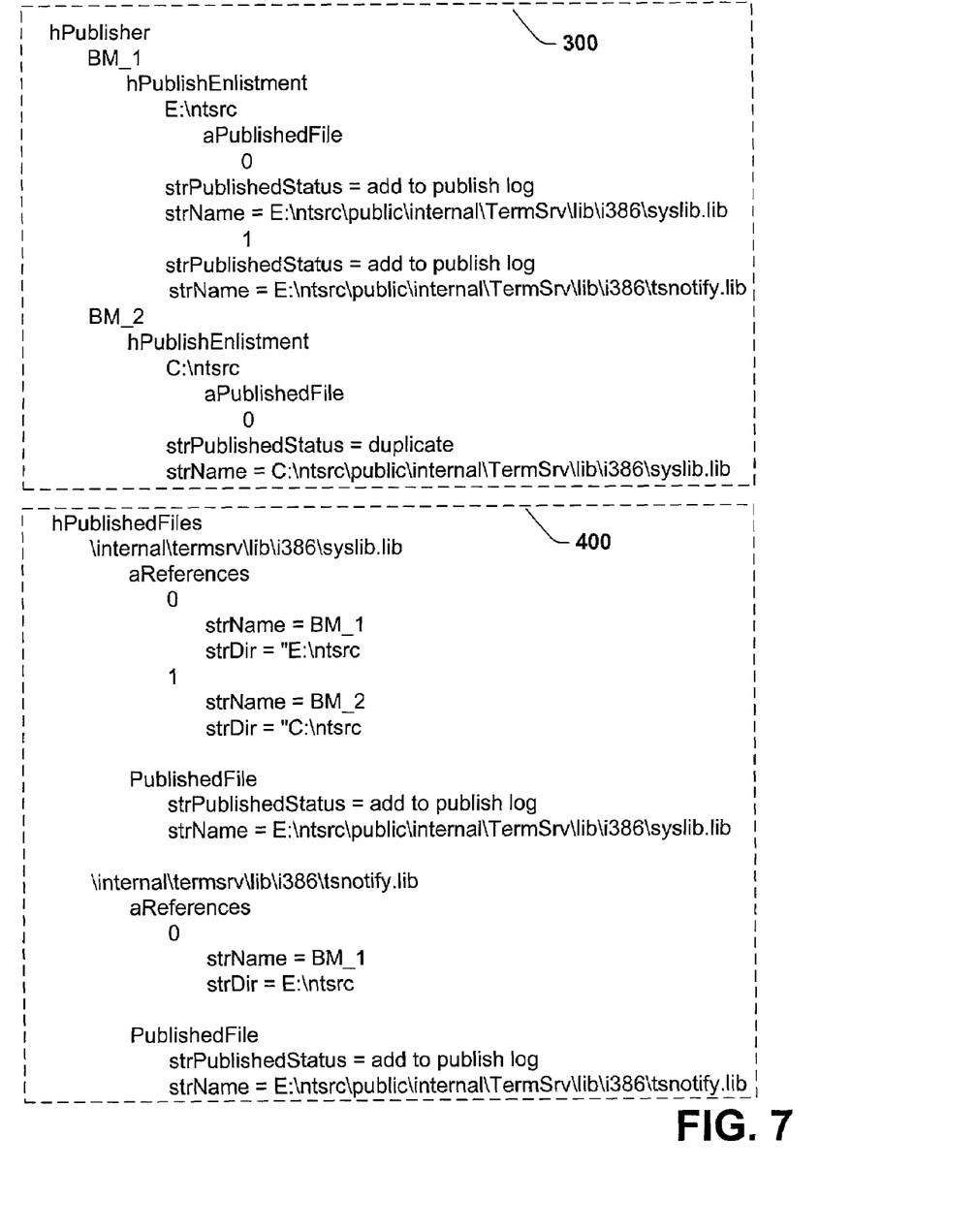
FIG. 7 is a representative segment of pseudocode describing data structures involved in managing the distribution and collection of files involved in building a software system in accordance with an aspect of the present invention.

Turning now to FIG. 7, a representative segment of pseudocode describing data structures involved in managing the distribution and collection of files involved in building a software system is illustrated. A data structure 300 (e.g. hpublisher) can reside in the build manager 14 (FIG. 1). The data structure 300 is illustrated as a nested data structure, hashed on build machine names. For example, two build machine names BM_1 and BM_2 are illustrated. A hash entry can include an array of file names, file paths and status indicators. For example, for the hash entry for the build machine BM_1, a path E:\ntsrc is illustrated. A file name public\internal\TermSrv\lib\i386\syslib.lib is illustrated and its status is indicated to be "add to publish log". Thus, the data structure 300 can be employed to store information that on a build machine named BM_1, at a path E:\ntsrc, a file named syslib.lib in the public\internal\TermSrv\lib\i386 directory should be added to the list of files to be published by the build machine BM_1. The data structure 300 can thus facilitate mitigating the bandwidth problems described above by reducing overall data traffic through processing file names and helping determine which files, if any, need to be distributed between build machines. It is to be appreciated by one skilled in the art that the data structure 300 is but one possible data structure that can be employed to store information concerning a list of file names to be distributed by one or more build machines. The data structure 300 can contain a first data field containing first data that represent the file names of files transmitted to the build manager 14 (FIG. 1). The data structure 300 can further contain a second data field containing second data representing a subset of the one or more file names corresponding to the one or more build files that are to be transmitted to the post build machine 16 (FIG. 1).

A data structure 400 (e.g. hPublished) can also reside in the build manager 14 (FIG. 1). The data structure 400 is illustrated as a nested data structure, hashed on file names.

A hash entry can contain an array of references to files including a name of a machine that published the file name used as the hash index and a reference to a directory wherein the file can be located. The data structure 400 can similarly facilitate mitigating the bandwidth problems described above by enabling more efficient file management in building software systems. It is to be appreciated by one skilled in the art that the data structure 400 is but one possible data structure that can be employed to store information concerning files that have been published by one or more build machines.

Figure 8:
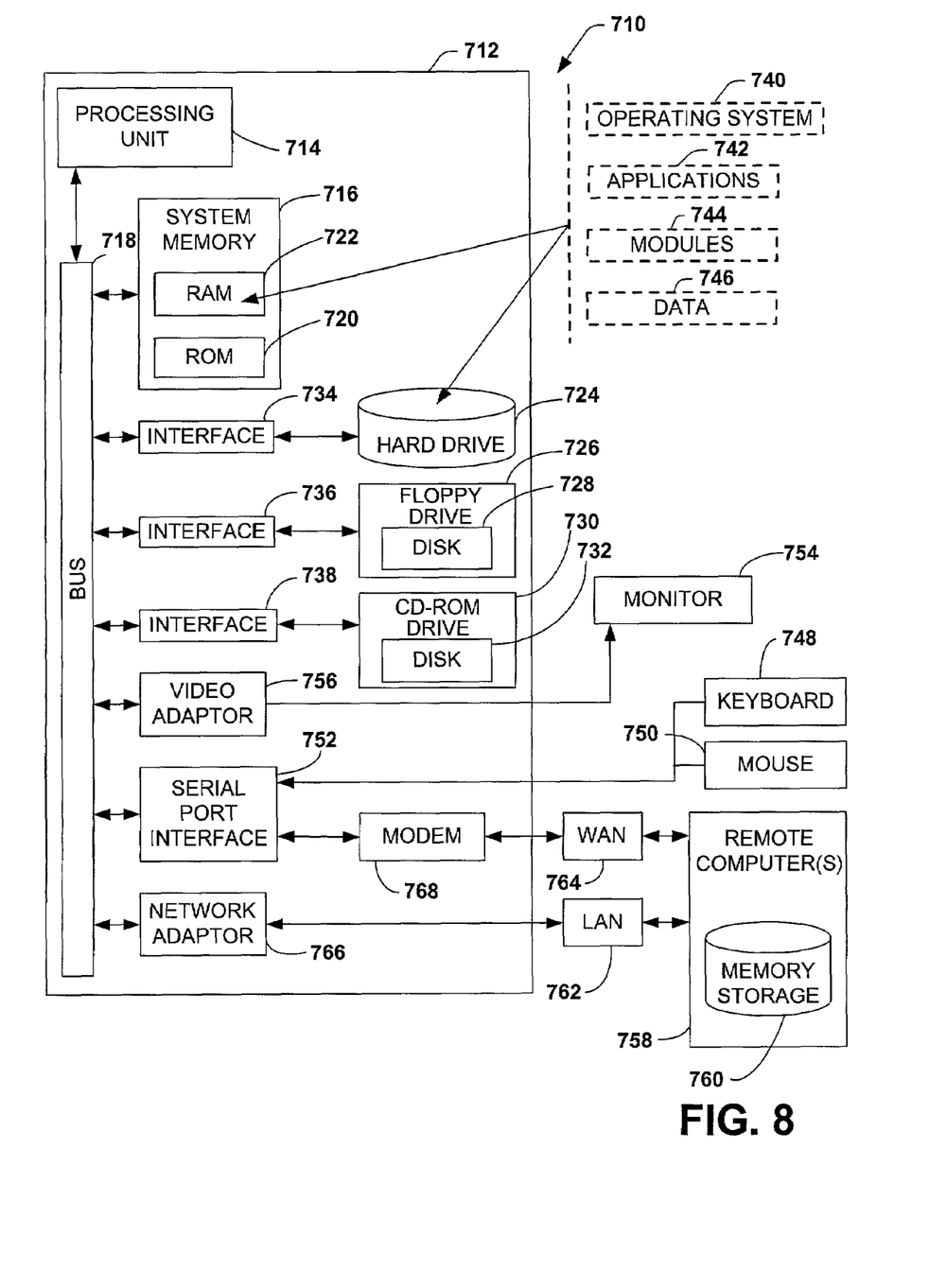
FIG. 8 is a schematic block diagram of an exemplary operating environment for a system configured in accordance with the present invention.

With reference to FIG. 8, an exemplary environment 710 for implementing various aspects of the invention includes a computer 712, including a processing unit 714, a system memory 716, and a system bus 718 that couples various system components including the system memory to the processing unit 714. The processing unit 714 can be any of various commercially available processors, including, but not limited to, Intel x86, Pentium® and compatible microprocessors from Intel and others, including Cyrix, AMD and Nexgen; Alpha® from Digital; MIPS® from MIPS Technology, NEC, IDT, Siemens, and others; and the PowerPC® from IBM and Motorola. Dual microprocessors, and other multi-processor architectures, also can be used as the processing unit 714.

The system bus 718 can be any of several types of bus structure including a memory bus or memory controller, a peripheral bus, and a local bus using any of a variety of conventional bus architectures such as PCI, VESA, Microchannel, ISA, and EISA, to name a few. The computer 712 memory includes read only memory (ROM) 720 and random access memory (RAM) 722. A basic input/output system (BIOS), containing the basic routines that help to transfer information between elements within the computer 712, such as during start-up, is stored in ROM 720.

The computer 712 further includes a hard disk drive 724, a magnetic disk drive 726, e.g., to read from or write to a removable disk 728, and an optical disk drive 730, e.g., for reading a CD-ROM disk 732 or to read from, or write to, other optical media. The hard disk drive 724, magnetic disk drive 726, and optical disk drive 730 are respectively connected to the system bus 718 by a hard disk drive interface 734, a magnetic disk drive interface 736, and an optical drive interface 738. The drives and their associated computer-readable media provide nonvolatile storage of data, data structures, computer-executable instructions, etc. for the computer 712, including for the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, Bernoulli cartridges, and the like, can also be used in the exemplary operating environment, and further that any such media may contain computer-executable instructions for performing the methods of the present invention.

A number of program modules can be stored in the drives and RAM 722, including an operating system 740, one or more application programs 742, other program modules 744, and program data 746. The operating system 740 in the illustrated computer is, for example, the "Microsoft® Windows® NT" operating system, although it is to be appreciated that the present invention can be implemented with other operating systems or combinations of operating systems, such as UNIX®, LINUX®, etc.

A user may enter commands and information into the computer 712 through a keyboard 748, and a pointing device, such as a mouse 750. Other input devices (not shown) may include a microphone, an IR remote control, a joystick, a game pad, a satellite dish, a scanner, or the like. These and other input devices are often connected to the processing unit 714 through a serial port interface 752 that is coupled to the system bus 718, but can be connected by other interfaces, such as a parallel port, a game port, a universal serial bus ("USB"), an IR interface, etc. A monitor 754, or other type of display device, is also connected to the system bus 718 via an interface, such as a video adapter 756. In addition to the monitor, a computer typically includes other peripheral output devices (not shown), such as speakers, printers, etc.

The computer 712 can operate in a networked environment using logical connections to one or more remote computers, such as a remote computer(s) 758. The remote computer(s) 758 can be a workstation, a server computer, a router, a personal computer, microprocessor based entertainment appliance (e.g., a WebTV® client system), a peer device or other common network node, and typically includes many or all of the elements described relative to the computer 712, although, for purposes of brevity, only a memory storage device 760 is illustrated. The logical connections depicted include a local area network (LAN) 762 and a wide area network (WAN) 764. Such networking environments are commonplace in offices, enterprise-wide computer networks, intranets, and the Internet.

When used in a LAN networking environment, the computer 712 is connected to the local network 762 through a network interface or adapter 766. When used in a WAN networking environment, the computer 712 typically includes a modem 768, or is connected to a communications server on the LAN, or has other means for establishing communications over the WAN 764, such as the Internet. The modem 768, which can be internal or external, may be connected to the system bus 718 via the serial port interface 752 to enable communications via, for example, the POTS. In an alternative embodiment, the modem 768 may be connected to the network adaptor 766 to enable communications via, for example, DSL and/or cable. In a networked environment, program modules depicted relative to the computer 712, or portions thereof, can be stored in the remote memory storage device 760. It will be appreciated that the network connections shown are exemplary and other means of establishing a communications link between the computers can be used.

What has been described above includes examples of the present invention. It is, of course, not possible to describe every conceivable combination of components or methodologies for purposes of describing the present invention, but one of ordinary skill in the art can recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising", as comprising is interpreted when employed as a transitional word in a claim.

What is claimed is:

1. A system for building a software system, the system comprising:
 a plurality of build machines to build the software system by generating build files, each of the build files stored locally on the build machine that generates the build file, at least two of the plurality of build machines executing on separate computers;

a first component for building a list of file names of one or more build files to be shared by at least some of the plurality of build machines employed in building the software system; and a second component for distributing to the at least some of the plurality of build machines the one or more build files identified in the list of file names, wherein, upon receiving the one or more build files identified in the list of files names, the at least some of the plurality of build machines store the one or more build files identified in the list of file names locally and wherein the first and second components are stored on computer-readable media.

2. The system of claim 1, wherein the first component and the second component execute on a plurality of computers.

3. The system of claim 1, wherein of the first component and the second component execute on separate computers.

4. The system of claim 1, wherein the list of file names of the one or more build files is a list of pathnames.

5. The system of claim 1, wherein the second component initiates file transfers within the system for building the software system.

6. The system of claim 1, wherein a process other than the first component, the second component or the plurality of build machines initiates file transfers within the system for building a software system.

7. The system of claim 1, wherein the first component builds a list of updates to build files to be shared by at least some of the plurality of build machines and the second component distributes the updates to one or more of the plurality of build machines.

8. The system of claim 1, further comprising a first data structure for storing the list of published file names.

9. The system of claim 8, wherein the data structure is a hash.

10. A system for building a software system the system comprising:

a plurality of build machines employed to build the software system, the plurality of build machines generating and storing locally build files to be published, at least two of the plurality of build machines executing on different computers; and a component to broadcast to one or more of the plurality of build machines at least one of the build files to be published; and a component to selectively receive and store persistently one or more of the broadcast build files, wherein an instance of both of the components is executing on each of the plurality of build machines and wherein the components are stored on computer-readable media.

11. A method for building a software system comprising:

collecting from one or more of a plurality of build machines one or more file names corresponding to one or more build files stored physically on the one or more of the plurality of build machines, at least two of the plurality of build machines operating on distinct computers;

determining which of the one or more build files are to be sent to a post build machine and are to be received from the post build machine;

sending to at least one of the plurality of build machines a list of file names of one or more build files to be sent to the post build machine; and sending to at least some of the plurality of build machines a list of file names of one or more build files to be received from the post build machine.

12. A computer-readable medium having stored thereon computer-executable instructions comprising:

collecting from one or more of a plurality of build machines one or more file names corresponding to one or more build files generated on the one or more of the plurality of build machines, each build file stored physically on the build machine that the build file was generated on, at least two of the plurality of build machines operating on different computers;

determining which of the one or more build files are to be sent to a post build machine;

sending to at least one build machine a list of file names of build files to be sent to the post build machine;

sending the one or more build files identified in the list of file names of build files to the post build machine.

13. A system for building a software system comprising:

means for collecting from one or more of a plurality of build machines one or more file names corresponding to one or more build files to be used to build the software system, each of the build files stored persistently locally on the build machine that the build file was created on, at least two of the plurality of build machines separate but networked together;

means for determining which of the one or more build files the one or more of a plurality of build machines are to send to a post build machine;

means for determining which of the one or more build files the one or more of a plurality of build machines are to receive from the post build machine;

means for sending to the one or more build machines a list of file names of build files to be sent to and received from the post build machine.

* * * * *